April 20, 1926.
M. W. RYAN ET AL
1,581,812
TEMPERATURE INDICATOR
Filed August 3, 1922
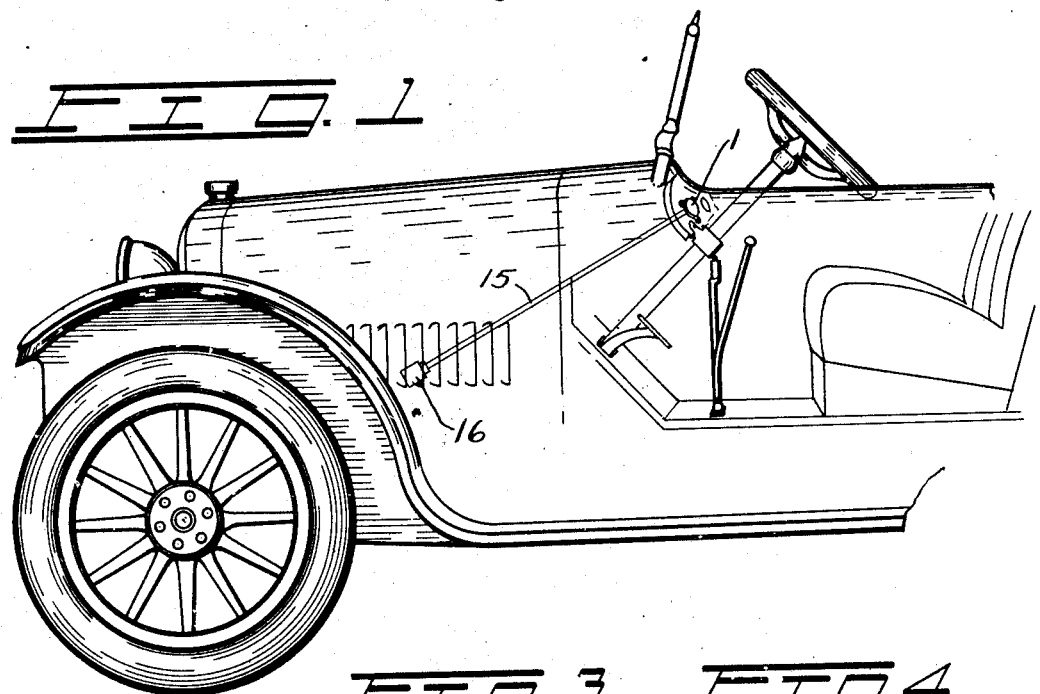
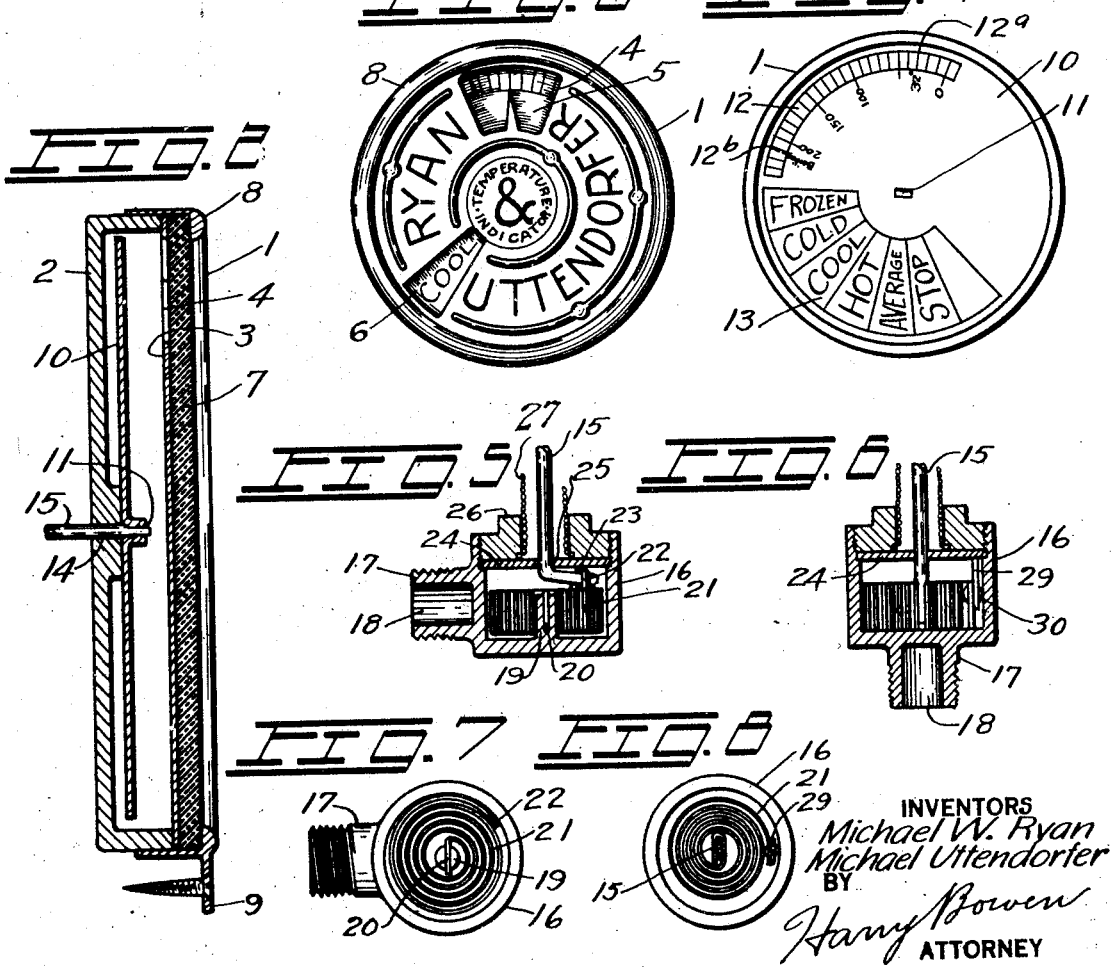
INVENTORS
Michael W. Ryan
Michael Uttendorfer
BY
Harry Bowen
ATTORNEY Patented Apr. 20, 1926.

1,581,812

UNITED STATES PATENT OFFICE.

MICHAEL W. RYAN AND MICHAEL UTTENDORFER, OF SEATTLE, WASHINGTON.

TEMPERATURE INDICATOR.

Application filed August 3, 1922. Serial No. 579,339.

*To all whom it may concern:*

Be it known that we, MICHAEL W. RYAN and MICHAEL UTTENDORFER, citizens of the United States, residing at Seattle, county of King, and State of Washington, have invented new and useful Improvements in Temperature Indicators; and we do hereby declare that the following is a full, clear, and exact specification, such as will enable others skilled in the art to which it appertains to make and use the same.

The invention is a device for indicating the temperature of the water in the water jacket or radiator of a motor vehicle and is located on the instrument board.

The invention is an improvement over our prior Patent Number 1,422,378, which was issued July 11, 1922, for a radio meter, in that the indicating dial that may be placed on the instrument board, is operated directly by the wire or flexible cable from the thermostatic element, and the casing in which the thermostatic element is placed may be installed in the water jacket at any point on the engine or on the radiator.

The object of the invention is to construct a device for indicating temperature changes which is directly connected to a thermostatic element.

Another object of the invention is to provide a casing that may be attached to any part of the water jacket of a motor vehicle engine or to the radiator, which casing may be directly connected to an indicating device on the instrument board.

And a further object of the invention is to provide an indicating device that may be placed on the instrument board which has only one moving part in it.

With these ends in view the invention embodies a casing with a flat plate, having openings in it, and a piece of glass, held by a suitable cap, which form a cover; and inside of the casing is a disc having a slotted hole in its center and graduations and notations on it. A rod or flexible shaft projects through a hole in the rear of the casing and into the slotted hole in the disc. The opposite end of the rod projects into another casing on the wall of the engine water jacket or radiator and is connected to a thermostatic element.

Other features and advantages will appear from the following description taken in connection with the drawings, wherein:—

Figure 1 is a side elevation of the front end of an automobile.

Figure 2 is a cross section on the center line of the indicating device.

Figure 3 is a front elevation of the indicating device.

Figure 4 is a view showing the disc in the indicating device.

Figure 5 is a cross section on the center line of the casing with the thermostatic element in it showing the rod attached to the outer end of the element.

Figure 6 is a similar section showing the rod attached to the center of the element.

Figure 7 is a plan view of the casing shown in Figure 5.

Figure 8 is a plan view of the casing shown in Figure 6.

In the drawings we have shown our indicator as it would be installed in Figure 1 wherein numeral 1 indicates the indicating device on the instrument board which is constructed with a casing 2 that is embedded in the instrument board. At the front of the casing is a plate 3 which has an opening 4 in it as shown in Figure 3 and in this opening is a pointer 5. In the lower part of the plate is another opening 6 which is of the shape and in the location as shown in Figure 3. On top of this plate is a piece of glass 7 and this is held in place by a cap 8 which snaps over the exterior of the casing and is held by screws in the flanges 9 to the instrument board. Inside of the casing is a disc 10 which has a slotted hole 11 in its center, graduations 12 on its upper side and notations 13 on its lower side. The disc may be painted red or with luminous paint and the graduations and notations may be put on with luminous paint; or just the words Frozen and Stop, and the lines indicated by the numerals 12$^a$ and 12$^b$ may be in red. In the center of the rear of the casing is a hole 14 through which a rod 15 projects and the end of this rod is flattened to fit into the slotted hole 11 in the center of the disc. The opposite end of this rod 15 projects into another casing 16 which has a lug 17 on it that may be screwed into the wall of the water jacket of a motor vehicle engine or into the wall of the radiator. Inside of this lug is an opening 18 which permits the fluid to come into close contact with the interior wall of the casing. Inside of the casing shown in Figure 5 is a lug 19 having a slot 20 in it and the inner end of the thermostatic element 21 which is constructed in the form of a coil spring is held in this slot. The outer end of the element has a projection 22 on it and this has a slot 23 in it into which the end of the rod 15 which may be bent at right angles to the rod projects so that as the projection 22 moves about the center it will twist the rod 15. A flat washer 24 is placed in the casing and this has a hole 25 in its center which forms a bearing for the rod. This washer is held in place by a nut 26 and this nut also holds a flexible casing 27 which forms a covering for the rod 15. It will be seen that either a straight rod or a flexible shaft may be used as the casing 16 may be located in any desired position.

In Figure 6 we have shown another casing 16 which is constructed with the lug 17 on one end instead of on the side, and the end of the rod 15 flattened and projecting into the center of the thermostatic element 21 where it is held by bending the inner end of the coil around it as shown in Figure 8. A section 29 of the washer 24 is stamped out and bent downward and the outer end of the thermostatic element is riveted to it by a rivet 30 as shown in Figure 6.

It will be understood that changes may be made in the construction without departing from the spirit of the invention. One of which changes may be in the shape of the slot 11 as this may be of any desired shape as long as it will cause the disc 10 to rotate with the rod 15. Another change may be in the shape of the casing of the indicating device 1, another in the design of the casing 16, and still another in the omission of the covering 27. It is also understood that any number of words or notations 13 may be used.

The construction will be readily understood from the foregoing description. To use the device it may be installed as shown and as the temperature of the water changes the disc 10 will rotate and cause the graduations 12 to move backward and forward by the pointer 5 and at the same time the words indicated by the numeral 13 will pass backward and forward so that they may be read through the opening 6. It will be seen that as the thermostatic element expands or contracts by the change in temperature it will twist the rod 15 and this will cause the disc 10 to rotate.

Having thus fully described the invention what we claim as new and desire to secure by Letters Patent, is:—

In a temperature indicator, a casing having a plate with openings in it, a disc with graduations and words thereon to indicate different stages of temperature, said graduations and words being arranged so that they may be read through the openings in the said plate and said disc having a slot in its center, a thermostatic element, a suitable casing for said thermostatic element, a rod attached to said thermostatic element and extending through said casing, said rod having its opposite end flattened and extending into the slot in the center of the disc.

MICHAEL W. RYAN.
MICHAEL UTTENDORFER.